US012732494B2

(12) United States Patent
Krishnamurthy et al.

(10) Patent No.: US 12,732,494 B2
(45) Date of Patent: Sep. 8, 2026

(54) NETWORK REPOSITORY FUNCTION FAILURE HANDLING

(71) Applicant: Nokia Technologies Oy, Espoo (FI)

(72) Inventors: Sandeep Raman Krishnamurthy, Bangalore (IN); Saurabh Khare, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 6 days.

(21) Appl. No.: 18/789,581

(22) Filed: Jul. 30, 2024

(65) Prior Publication Data

US 2025/0047655 A1 Feb. 6, 2025

(30) Foreign Application Priority Data

Aug. 3, 2023 (IN) ............................ 202311052126

(51) Int. Cl.
*H04L 9/00* (2022.01)
*H04L 9/40* (2022.01)

(52) U.S. Cl.
CPC .......... *H04L 63/0807* (2013.01); *H04L 63/20* (2013.01)

(58) Field of Classification Search
CPC ... H04L 63/0807; H04L 63/20; H04L 9/3213; H04L 41/06; H04L 43/10; H04W 12/06
See application file for complete search history.

(56) References Cited

U.S. PATENT DOCUMENTS

| | | | | |
|---|---|---|---|---|
| 2022/0224589 | A1* | 7/2022 | Das | H04W 12/084 |
| 2024/0007858 | A1* | 1/2024 | Mohan Raj | H04L 63/0236 |
| 2024/0031347 | A1* | 1/2024 | Mantha | H04L 63/08 |
| 2024/0251373 | A1* | 7/2024 | Goel | H04W 48/16 |
| 2025/0168155 | A1* | 5/2025 | Li | H04W 12/084 |

OTHER PUBLICATIONS

"3rd Generation Partnership Project; Technical Specification Group Services and System Aspects; Security architecture and procedures for 5G system (Release 18)", 3GPP TS 33.501, V18.2.0, Jun. 2023, pp. 1-308.

* cited by examiner

*Primary Examiner* — Syed M Ahsan
(74) *Attorney, Agent, or Firm* — Lippes Mathias LLP

(57) ABSTRACT

Based on determining (S211) that each of one or more NRFs of a mobile communication network system has become unavailable, switching (S213) to an NRF-unavailable state in which a validation of an NF service consumer based on an access token for a service request towards an NF service producer is relaxed is performed. The service request is sent (S215) towards the NF service producer, the service request comprising at least an indication of the NRF-unavailable state. Upon receipt (S221) of the service request, the service request is processed (S223) based on the indication of the NRF-unavailable state.

18 Claims, 6 Drawing Sheets

NETWORK REPOSITORY FUNCTION FAILURE HANDLING

TECHNICAL FIELD

At least some example embodiments relate to NRF (Network Repository Function) failure handling.

BACKGROUND

Currently in a 5G Core network, NRF plays a central role in discovery and registration of various 5G service endpoints. This enables a collaborative mechanism for 5G peers to offer their services and also for consumers to get the services they need. Failure of the NRF is a very critical failure in the network and causes the entire network operations to fail and causes a complete outage.

LIST OF ABBREVIATIONS

5G Fifth Generation
5GC 5G Core
AF Application Function
API Application Program Interface
AUSF Authentication Server Function
CCA Client Credentials Assertion
FQDN Full Qualified Domain Name
ID Identifier
JSON JavaScript Object Notation
NF Network Function
NRF Network Repository Function
OAUTH Open Authorization
PLMN Public Land Mobile Network
SBI Service-Based Interface
SCP Service Communication Proxy
SEPP Security Edge Protection Proxy
TLS Transport Layer Security
TMO Trunked Mode Operation
UDM Unified Data Management
UE User Equipment

LIST OF CITATIONS

3GPP TS 33.501 version 18.2.0, chapters 13.3.0 and 13.3.8

SUMMARY

At least some example embodiments provide for mechanisms for a network of a mobile communication network system, e.g. for a 5G Core network, to continue its operation with a degree of security in case of complete NRF failure or non-availability of NRF endpoints to certain NFs in the network.

According to at least some example embodiments, methods, apparatuses and non-transitory computer-readable storage media are provided, as specified by the appended claims.

According to at least some example embodiments, mechanisms to failover to communication Model A in case an NRF is unavailable are provided.

At least some example embodiments provide for a solution to the problem of NRF-unavailability for multiple PLMN scenarios.

In the following, an explanatory example and example embodiments will be described with reference to the accompanying drawings.

DESCRIPTION OF THE EMBODIMENTS

In this application, terms "consumer" and "NF service consumer", and terms "producer" and "NF service producer" are used interchangeably.

Figure 1:
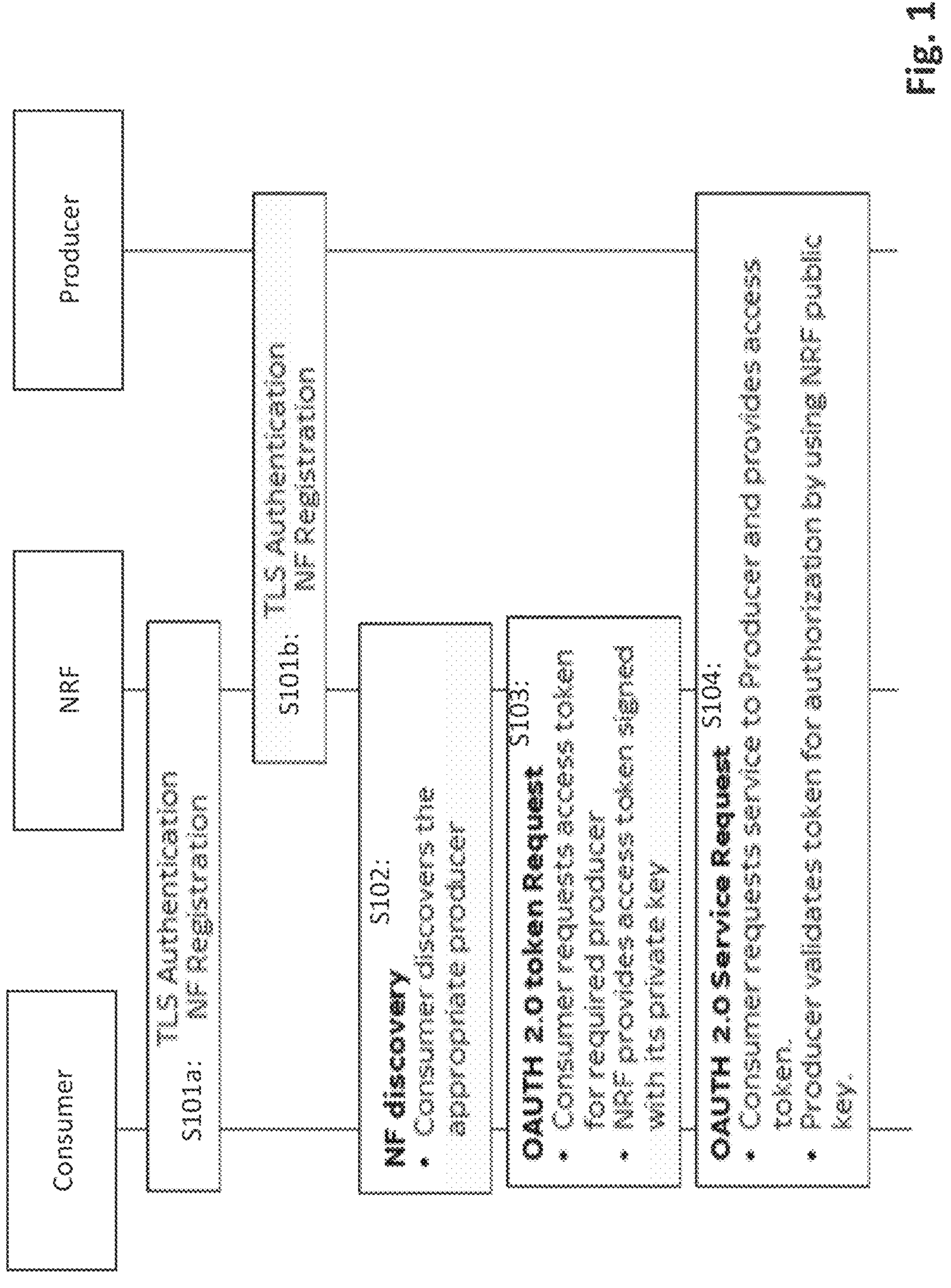
FIG. 1 shows a signaling diagram illustrating a call flow for OAUTH based communication between producer and consumer in 5GC according to an explanatory example.

First, reference is made to FIG. 1 illustrating a call flow for OAUTH based communication between producer and consumer in 5GC according to an explanatory example.

In step S101*a*, a consumer (NF service consumer) of a service, also referred to as a service consumer (NF service consumer), in a network of a mobile communication network system, e.g. in a 5GC, performs TLS authentication and NF registration with an NRF of the network.

In step S101*b*, a producer (NF service producer) of a service, also referred to as service producer (NF service producer), in the network of the mobile communication network system, e.g. in the 5GC, performs TLS authentication and NF registration with the NRF.

The Network Function (NF) Repository Function (NRF) is the network entity in the 5G Core Network (5GC) supporting the following functionality:

- Maintains the NF profile of available NF instances and their supported services;
- Allows other NF instances to subscribe to, and get notified about, the registration in NRF of new NF instances of a type;
- Supports service discovery function. It receives NF Discovery Requests from NF instances, and provides the information of the available NF instances fulfilling certain criteria (e.g., supporting a given service).

In step S102, the consumer does NF discovery based on need from NRF. In other words, the consumer discovers an appropriate producer, e.g. a producer of a service required by the consumer.

In step S103, the consumer requests for OAUTH token (also referred to as "access token") to be issued for the required producer. The NRF provides the access token signed with its private key.

In step S104, with the NRF provided OAUTH token, the consumer places a service request to the producer. The producer validates the provided OAUTH token with the NRF public key and against expiry for authorization. In case the producer determines that the access token is correct and not expired, the service is provided to the consumer by the producer.

The above-described mechanism can be applied in a Model B communication which is a direct communication between consumer and producer with NRF interaction, in a Model C communication which is an indirect communication without delegated discovery, and in a Model D communication which is an indirect communication with delegated discovery.

It is noted that the procedure shown in FIG. 1 is common for all sessions of same AF towards UE.

There are mechanisms concentrating on increasing the availability of the NRF, by creating multiple redundant NRF instances and various NFs having access to multiple NRFs in case of a subset failure. However, these mechanisms do not address a complete NRF failure.

Figure 2:
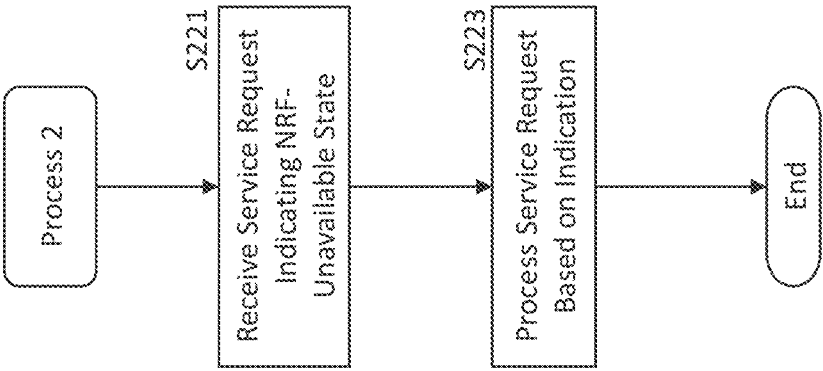
FIG. 2 shows flowcharts illustrating processes for NRF failure handling according to at least some example embodiments.
Figure 2:
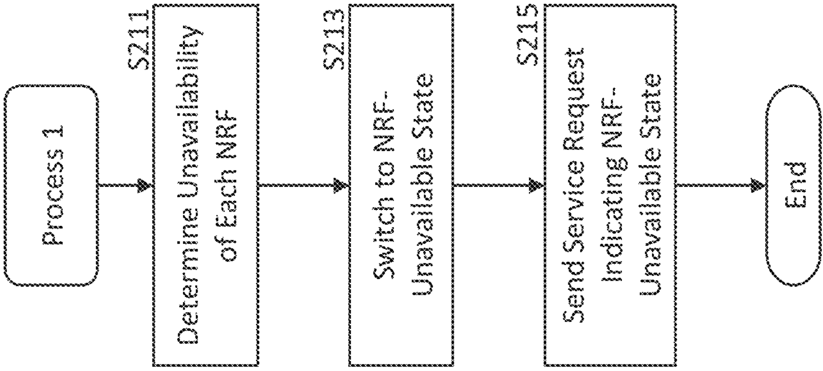

Now, reference is made to FIG. 2 illustrating processes 1 and 2 for NRF failure handling according to at least some example embodiments.

Process 1 may be performed by a consumer (NF consumer) of a service, also referred to as a service consumer (NF service consumer), in a network of a mobile communication network system, e.g. in a 5GC. The consumer may have performed TLS authentication and NF registration with an NRF of the network earlier.

Alternatively, in indirect communication methods such as Model C and Model D communications, process 1 may be performed by a service communication proxy, e.g. an SCP, of the NF service consumer.

Process 1 may be started in an event in which the consumer starts an NF discovery for discovering an appropriate producer of a service.

In step S211, it is determined that each of one or more network repository functions, NRFs, of a mobile communication network system has become unavailable. Then, process 1 advances to step S213.

In step S213, based on the determining, switching to an NRF-unavailable state in which a validation of a NF service consumer based on an access token for a service request towards a NF service producer is disabled or at least relaxed is performed. Then, process 1 advances to step S215.

The access token for the validation is to be acquired from the one or more NRFs. That is, nominally, the access token for the validation is to be acquired from the one or more NRFs. In the NRF-unavailable state, however, the NF service consumer or the SCP cannot acquire an OAUTH access token (access token for the validation) from the NRFs. The NF service consumer or the SCP may use a previously received OAUTH access token if available, even if expired.

The service request is a request for a service to be provided by the NF service producer. The NF service consumer is a consumer of the service to be provided by the NF service producer.

In step S215, the service request is sent towards the NF service producer. The service request comprises at least an indication of the NRF-unavailable state. Then, process 1 ends.

According to at least some example embodiments, above steps S211 and S213 correspond to step S301 of FIG. 3 to be described in more detail later on, and step S215 corresponds to step S303 of FIG. 3.

Further, according to at least some example embodiments, above steps S211 and S213 correspond to step S402 of FIG. 4 to be described in more detail later on, and step S215 corresponds to step S403 of FIG. 4.

Still further, according to at least some example embodiments, above step S211 corresponds to step S504 of FIG. 5 to be described in more detail later on, and step S215 corresponds to step S505 of FIG. 5.

According to at least some example embodiments, in case the access token for the service request towards the NF service producer had been acquired from the one or more NRFs before each of the one or more NRFs became unavailable, the service request sent in S215 further comprises the access token, wherein the access token has expired.

According to at least some example embodiments, in the NRF-unavailable state, a static authorization model which is based on a local configuration is adopted.

According to at least some example embodiments, the NF service producer is identified based on the local configuration.

According to at least some example embodiments, step S215 comprises routing the service request via a service communication proxy (e.g. SCP) to be used for indirect communication between the NF service consumer and the NF service producer.

According to at least some example embodiments, the service request sent in S215 further comprises a client credentials assertion, CCA, token associated with the NF service consumer, wherein the CCA token is to be used for validation of the NF service consumer.

According to at least some example embodiments, the service request sent in S215 further comprises an identifier of each of the one or more NRFs.

According to at least some example embodiments, operation update messages are periodically transmitted to each of the one or more NRFs, and it is determined in S211 that each of the one or more NRFs has become unavailable in case, in response to the operation update messages, no reply messages are received continuously over a predetermined time period.

According to at least some example embodiments, a notification that each of the one or more NRFs has become unavailable is received, and it is determined in S211 that each of the one or more NRFs has become unavailable based on the notification.

According to at least some example embodiments, the one or more NRFs are part of a mobile network of the mobile communication network system, in which the NF service producer is located.

According to at least some example embodiments, the notification is received from an NRF of a mobile network of the mobile communication network system, in which the NF service consumer is located, in response to a request for an access token sent (by the NF service consumer or service communication proxy (e.g. SCP) to be used for indirect communication between the NF service consumer and the NF service producer) to the NRF or another NRF of the mobile network in which the NF service consumer is located.

According to at least some example embodiments, in step S215, in case the NF service producer and the NF service consumer are located in the same mobile network of the mobile communication network system, the service request is sent to the NF service producer.

According to at least some example embodiments, in step S215, in case the NF service producer and the NF service consumer are located in different mobile networks of the mobile communication network system, the service request is sent to a mobile network in which the NF service producer is located.

According to at least some example embodiments, at least one of the NF service consumer or a service communication proxy (e.g. SCP) to be used for indirect communication between the NF service consumer and the NF service producer had been registered in the one or more NRFs before each of the one or more NRFs became unavailable.

According to at least some example embodiments, at least one of the NF service consumer or the service communication proxy had performed transport layer security, TLS, authentication with the one or more NRFs before each of the one or more NRFs became unavailable.

Process 2 may be performed by a producer (NF service producer) of a service, also referred to as service producer (NF service producer), in the network of the mobile communication network system, e.g. in the 5GC. The producer may have performed TLS authentication and NF registration with an NRF earlier. For example, the NF service producer comprises an AUSF/UDM of a PLMN.

Alternatively, in indirect communication methods such as Model C and Model D communications, process 2 may be performed by a service communication proxy, e.g. an SCP, of the NF service producer.

According to at least some example embodiments, process 2 is at least partially performed by a security edge protection proxy (SEPP) of a public land mobile network (PLMN).

In step S221, a service request which comprises at least an indication of an NRF-unavailable state is received, the indication of the NRF-unavailable state indicating that each of one or more NRFs of a mobile communication network system has become unavailable, and that a validation of an NF service consumer based on an access token for a service request towards a NF service producer is disabled or at least relaxed.

The access token for the validation is to be acquired from the one or more NRFs. That is, nominally, the access token for the validation is to be acquired from the one or more NRFs. In the NRF-unavailable state, however, the NF service consumer or the SCP cannot acquire an OAUTH access token (access token for the validation) from the NRFs. The NF service consumer or the SCP may use a previously received OAUTH access token if available, even if expired.

The service request is a request for a service to be provided by the NF service producer, and the NF service consumer is a consumer of the service to be provided by the NF service producer. Then, process 2 advances to step S223.

In step S223, the service request is processed based on the indication of the NRF-unavailable state. Then, process 2 ends.

Figure 3:
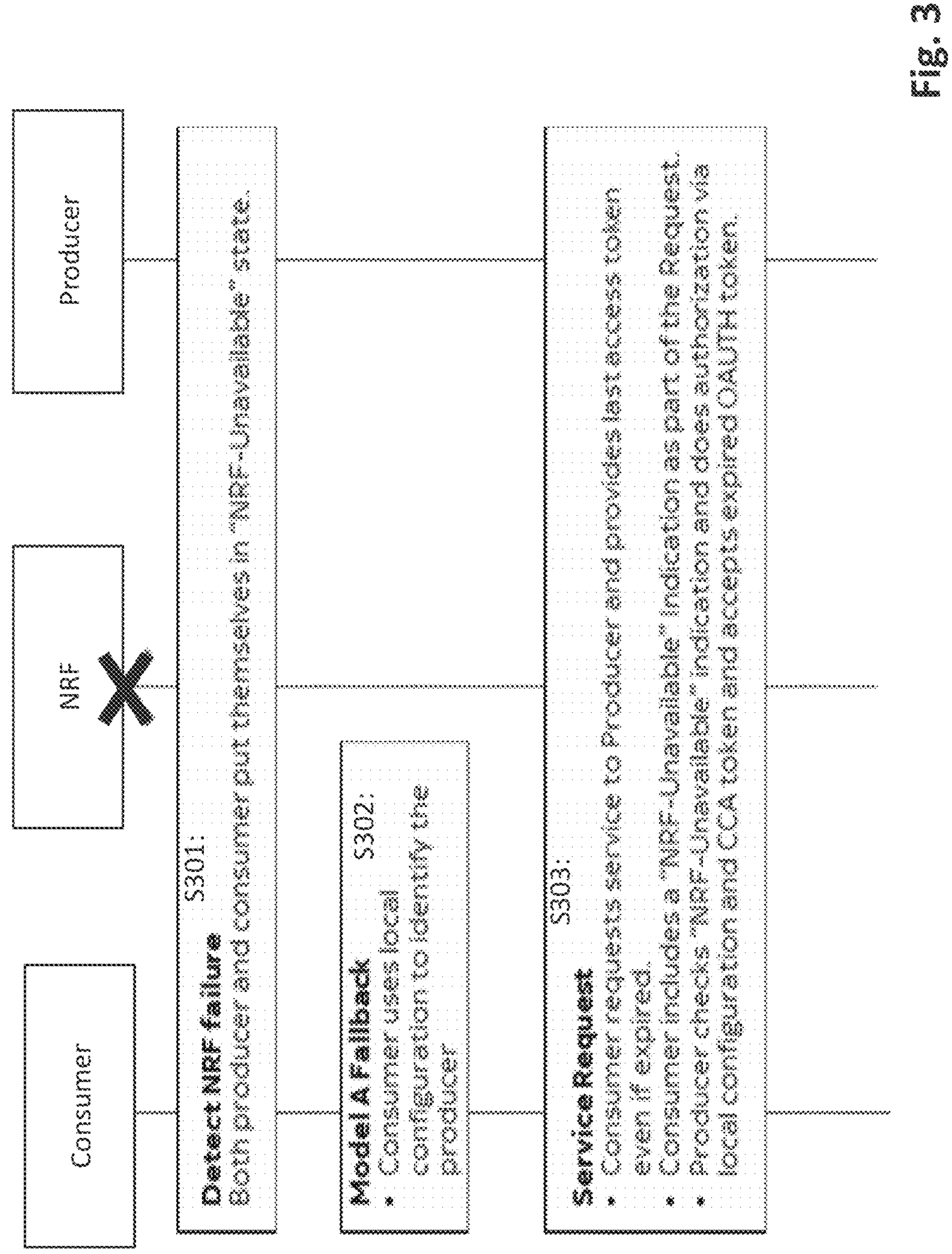
FIG. 3 shows a signaling diagram illustrating a call flow between producer and consumer in case of NRF failure according to at least some example embodiments.

According to at least some example embodiments, steps S221 and S223 of process 2 correspond to step S303 of FIG. 3.

Figure 4:
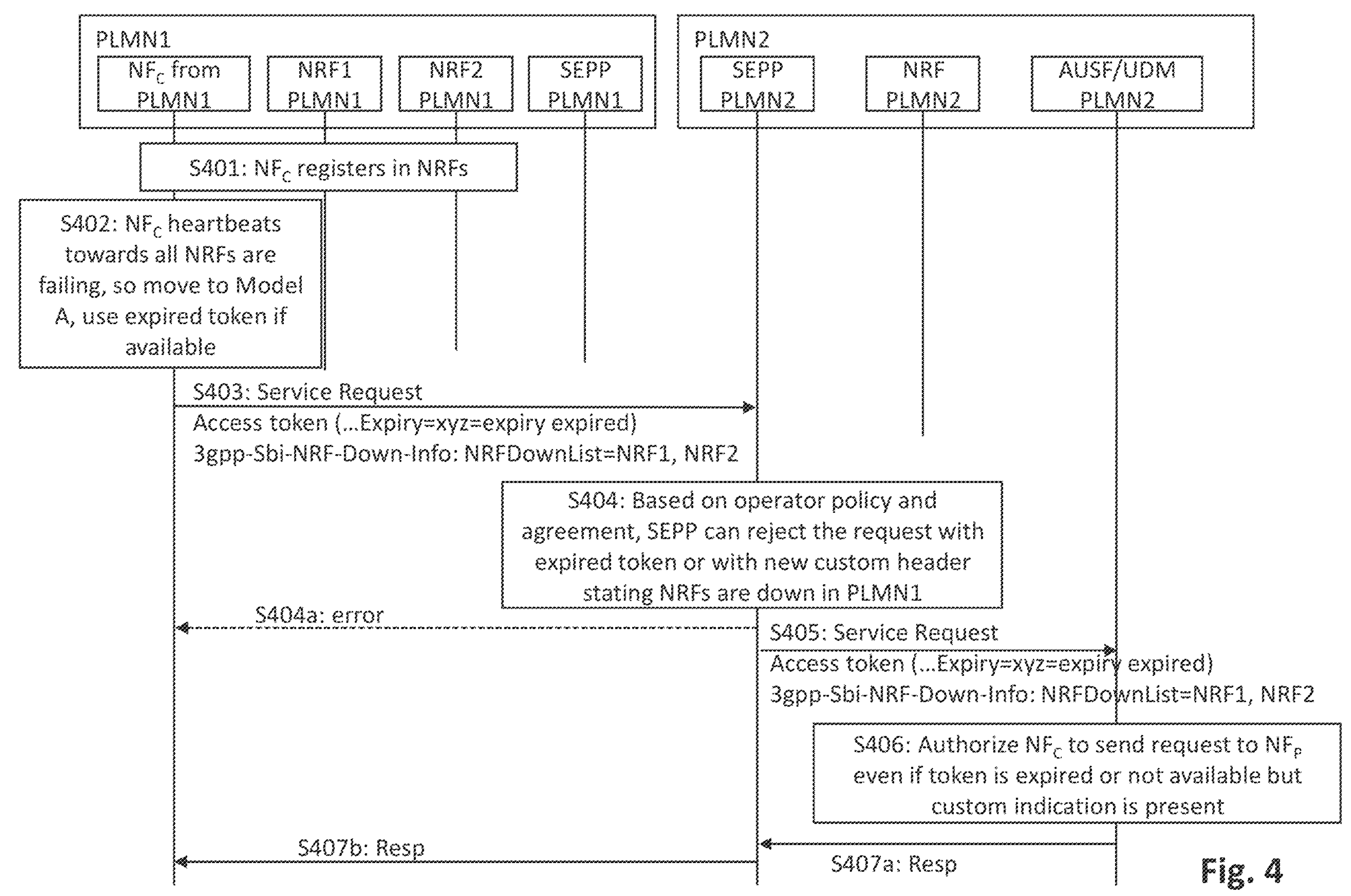
FIG. 4 shows a signaling diagram illustrating a call flow in case of consumer side NRF failure in an inter PLMN scenario according to at least some example embodiments.

According to at least some example embodiments, S221 corresponds to S403 of FIGS. 4 and S223 corresponds to S404 and S404*a* or S405 of FIG. 4.

According to at least some example embodiments, S221 corresponds to S405 of FIGS. 4 and S223 corresponds to S406 of FIG. 4.

Figure 5:
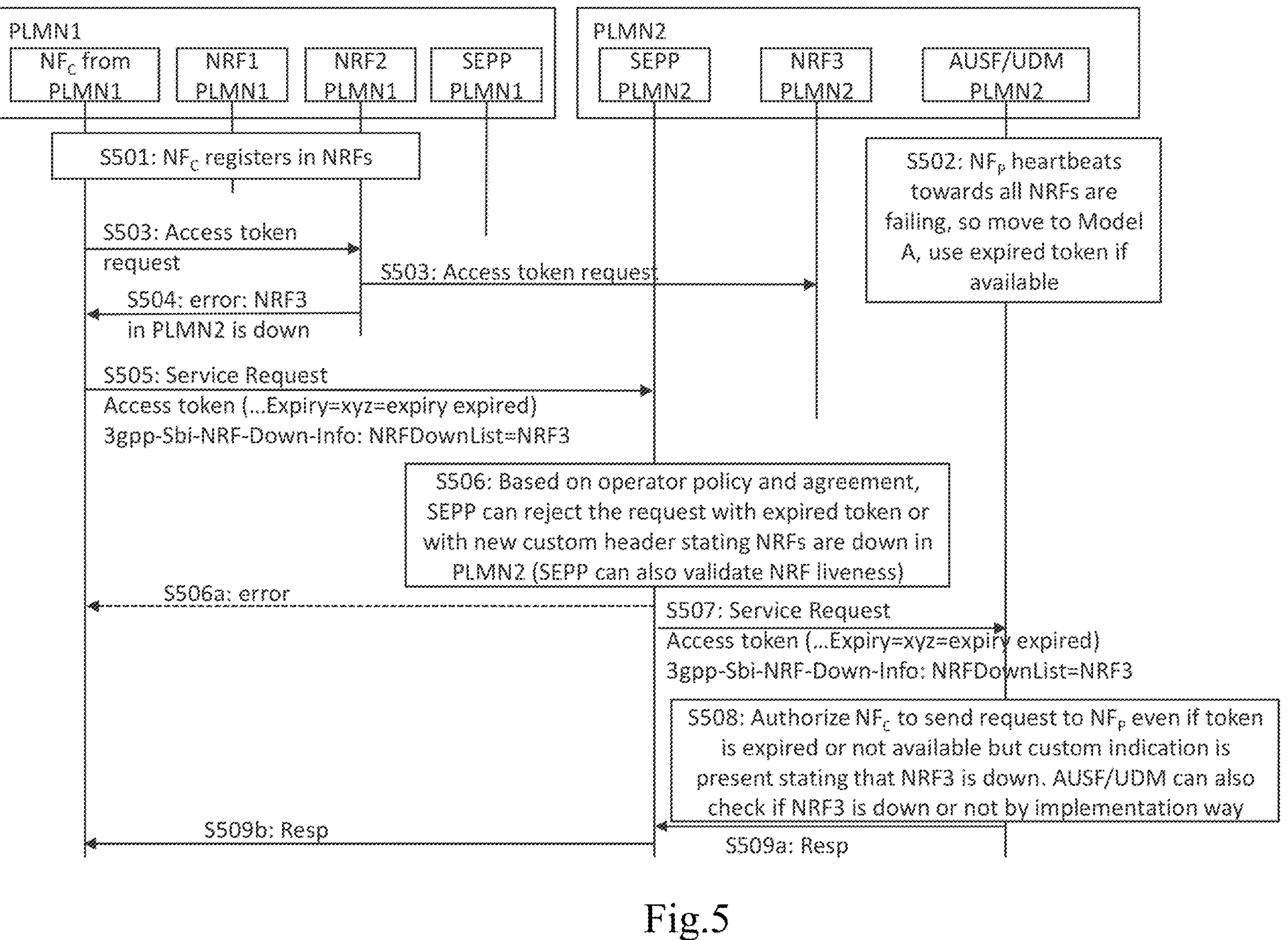
FIG. 5 shows a signaling diagram illustrating a call flow in case of producer side NRF failure in an inter PLMN scenario according to at least some example embodiments.

According to at least some example embodiments, S221 corresponds to S505 of FIGS. 5 and S223 corresponds to S506 and S506*a* or S507 of FIG. 5.

According to at least some example embodiments, S221 corresponds to S507 of FIGS. 5 and S223 corresponds to S508 of FIG. 5.

According to at least some example embodiments, the service request received in S221 further comprises the access token that has expired.

According to at least some example embodiments, the service request received in S221 further comprises a client credentials assertion, CCA, token associated with the NF service consumer, wherein the CCA token is to be used for validation of the NF service consumer.

According to at least some example embodiments, the service request received in S221 further comprises an identifier of each of the one or more NRFs.

According to at least some example embodiments, the service request is processed in S223 based on the indication of the NRF-unavailable state and at least one of the access token, the CCA token, or the identifier of each of the one or more NRFs.

According to at least some example embodiments, it is determined that each of the one or more NRFs has become unavailable.

According to at least some example embodiments, operation update messages are periodically transmitted to each of the one or more NRFs, and it is determined that each of the one or more NRFs has become unavailable in case, in response to the operation update messages, no reply messages are received continuously over a predetermined time period.

According to at least some example embodiments, based on the determining, switching to the NRF-unavailable state is performed.

According to at least some example embodiments, the NF service producer is in the NRF-unavailable state when it receives the service request.

According to at least some example embodiments, in the NRF-unavailable state, a static authorization model which is based on a local configuration is adopted.

According to at least some example embodiments, the processing in S223 comprises performing authorization of the NF service consumer based on the local configuration.

According to at least some example embodiments, in case the service request received in S221 further includes the CCA token associated with the NF service consumer, the authorization of the NF service consumer is performed based on the local configuration and the CCA token.

According to at least some example embodiments, the processing in S223 comprises forwarding the service request to the NF service producer, e.g. an authentication server function.

According to at least some example embodiments, the processing in S223 comprises returning an error message.

According to at least some example embodiments, the processing in S223 comprises, in case the service request further includes the access token that has expired, accepting the access token that has expired.

According to at least some example embodiments, the processing in S223 further comprises, in case the service request further includes the identifier of each of the one or more NRFs, checking, based on the identifier, whether or not each of the one or more NRFs is available.

According to at least some example embodiments, in case of checking that at least one of the one or more NRFs indicated in the service request is available, an error message is returned in response to the service request.

According to at least some example embodiments, in case of checking that each of the one or more NRFs indicated in the service request is not available, the service request is forwarded to the NF service producer, e.g. the authentication server function.

According to at least some example embodiments, in case of checking that each of the one or more NRFs indicated in the service request is not available, authorization of the NF service consumer is performed e.g. based on a local configuration.

According to at least some example embodiments, the checking comprises periodically transmitting operation update messages to each of the one or more NRFs indicated in the service request, wherein it is determined that each of the one or more NRFs indicated in the service request is not available in case, in response to the operation update messages, no reply messages are received continuously over a predetermined time period.

According to at least some example embodiments, mechanisms to failover to a Model A communication when an NRF is unavailable are provided. A Model A communication is a communication between NF service consumer and NF service producer without NRF interaction.

In a network, a simple failover to Model A from Model B, C or D is not a straightforward solution. When failing over to Model A, the consumer can fallback to a local configuration to access the producer, however, the consumer is no longer able to provide the OAUTH related tokens as part of a service request. This can cause failure from the producer who no longer gets the token or gets an expired token from the consumer. This can cause a service outage.

In the following, a single PLMN scenario will be described with reference to FIG. 3 illustrating a call flow between producer and consumer in case of NRF failure. In the single PLMN scenario, NF service consumer and NF service producer are located in a single PLMN.

In case of a complete network outage for the NRF, each NF detects and determines that all configured NRFs are unavailable and puts itself to "NRF-unavailable" state. This is illustrated in S301 of FIG. 3, in which both producer and consumer detect NRF failure and put themselves in "NRF-unavailable" state.

NRF failure can be detected e.g. by detecting that NF heartbeats messages are failing continuously (e.g. are crossing a threshold) towards each of one or more NRFs. Each NF that has previously registered in NRF shall contact the NRF periodically (heart-beat), by invoking an NFUpdate service operation, in order to show that the NF is still operative. In case no reply messages to such periodically transmitted operation update message are received continuously over a predetermined time period it can be determined by the NF that the NRFs have become unavailable.

In the NRF-unavailable state, each of the NFs reverts to a configuration-based authorization model for the peers, e.g. a static authorization model defined in 3GPP TS 33.501. This is illustrated for the NF service consumer by step S302 of FIG. 3. The NF service consumer adopts Model A communication.

OAUTH token validation is disabled or at least relaxed at this time. In addition, a Client Credentials Assertion (CCA) token issued by the consumer can be used as the validator of the claim-of-self made by the consumer. TLS connectivity also acts as an additional level of security.

The consumer relies on local configuration to identify the producer to connect as in Model A (S302). In step S303, the NF service consumer sends a service request to the NF service producer. The service request can also be routed via an SCP associated with the NF service consumer or an SCP associated with the NF service producer if available.

In the service request of S303, the consumer may send the last OAUTH token even if expired to the producer.

The consumer adds an indication to the service request that it is in "NRF-Unavailable" state. To support the same, a new custom header can be introduced or an existing custom header can be enhanced. Alternatively, an indication can be added in each message/JSON as well.

An example of a new customer header format is:

3gpp-Sbi-NRF-Down-Info which contains the list of NRFs instance id/fqdn where NFc is not able to reach.

For example:

3gpp-Sbi-NRF-Down-Info:

NRFDownList=NRFInstanceId1, NFInstanceId2.

This indication is used to validate the relaxation of the OAUTH validation to allow an expired token claim made by the consumer in case that the producer still has NRF connectivity and the consumer does not.

In other words, in S303, the producer checks the "NRF-unavailable" indication and authorizes via local configuration and CAA token and accepts the expired OAUTH token.

The processes shown in FIG. 3 can also be adopted by SCP in case of Model D communication.

Now, an inter-PLMN scenario will be described with reference to FIG. 4 illustrating a call flow in case of consumer side NRF failure. In the inter-PLMN scenario of FIG. 4, NF service consumer ($NF_C$) is located in PLMN1 of a mobile communication network system, and NF service producer ($NF_P$) (AUSF/UDM in the scenario of FIG. 4) is located in PLMN2 of the mobile communication network system.

In S401, the NF service consumer of PLMN1 registers in NRF1, NRF2 of PLMN1.

In S402, the NF service consumer sends heart-beat messages to each of NRF1 and NRF2. In case the heart-beat messages towards each of NRF1 and NRF2 are failing, the NF service consumer moves to Model A communication, using an expired access token if available. According to at least some example embodiments, step S402 corresponds to S301 and S302 of FIG. 3.

In S403, the NF service consumer sends a service request towards the NF service producer (identified using local configuration), indicating in the service request "NRF-unavailable" state e.g. using "3gpp-Sbi-NRF-Down-Info". The service request may further include an (expired) access token and a list of unavailable NRFs (NRFDownList) NRF1, NRF2.

The NF service producer is located in PLMN2, and NRF of PLMN2 is available. SEPP of PLMN2 receives the service request issued by the NF service consumer. In step S404, based on operator policy and agreement, considering token is not available or expired token is available, even if custom header is present, SEPP can reject the service request as illustrated by S404*a* in which SEPP returns an error.

Alternatively, based on operator policy and agreement, SEPP forwards the service request to AUSF/UDM of PLMN2, as illustrated by S405.

In the scenario illustrated in FIG. 4, at least one of AUSF or UDM is/are shown as NF service producer. However, the NF service producer is not limited to AUSF or UDM, and the NF service producer can be any network function in PLMN2 that provides a service. In other words, based on different use case, different NF service producer is invoked.

In S406, AUSF/UDM may perform authorization of the NF service consumer even if token is expired or not available but the custom indication is present.

Additionally, SEPP, AUSF/UDM or $NF_P$ may validate the list of unavailable NRFs indicated in the custom header (i.e. check, if NRF ID available in the custom header is actually down or not) (e.g. if heart beat is successful to the NRF or via implementation way) before providing the service.

In steps S407*a,b* the AUSF/UDM sends a response towards the NF service consumer via SEPP of PLMN2.

FIG. 5 illustrates a call flow in case of producer side NRF failure in an inter-PLMN scenario. A NF service consumer ($NF_C$) is located in PLMN1 of a mobile communication network system, and a NF service producer ($NF_P$) (AUSF/UDM in the scenario of FIG. 5) is located in PLMN2 of the mobile communication network system.

In S501, the NF service consumer of PLMN1 registers in NRF1, NRF2 of PLMN1.

According to S502, heart-beat messages are sent towards each of one or more NRFs (NRF3 of PLMN2 in the present case) by the NF service producer (AUSF/UDM in the scenario of FIG. 5). In case the heart-beat messages towards NRF3 are failing, the NF service producer moves to Model A communication, using an expired access token if available.

In S503, NRF2 receives an access token request from the NF service consumer and forwards the access token request to NRF3 of PLMN2. In case access token APIs fail, NRF2 of PLMN1 determines that NRF3 in PLMN2 is not available, and provides an error indication to the NF service consumer (S504). The error indication includes an identifier of NRF3 that is not available in PLMN2. The NF service consumer moves to Model A communication, using an expired token if available.

In S505, the NF service consumer sends a service request towards the NF service producer (identified using local configuration), indicating in the service request "NRF-unavailable" state e.g. using "3gpp-Sbi-NRF-Down-Info". The service request may further include an (expired) access token and a list of unavailable NRFs (NRFDownList) NRF3.

SEPP of PLMN2 receives the service request issued by the NF service consumer. In step S506, based on operator policy and agreement, considering token is not available or expired token is available, even if custom header is present, SEPP can reject the service request as illustrated by S506*a* in which SEPP returns an error.

Alternatively, based on operator policy and agreement, SEPP forwards the service request to AUSF/UDM of PLMN2, as illustrated by S507.

In S508, AUSF/UDM may perform authorization of the NF service consumer even if token is expired or not available but the custom indication is present.

Additionally, SEPP, AUSF/UDM or $NF_P$ may validate the list of unavailable NRFs indicated in the custom header before providing the service. In other words, SEPP, AUSF/UDM or $NF_P$ may check if NRF ID available in the custom header is actually down or not (e.g. if heart beat is successful to the NRF or via implementation way).

SEPP, AUSF/UDM or $NF_P$ can provide the requested service to NFc or reject the service request based on information available in the custom header.

In steps S509*a,b* the AUSF/UDM sends a response towards the NF service consumer via SEPP of PLMN2.

Figure 6:
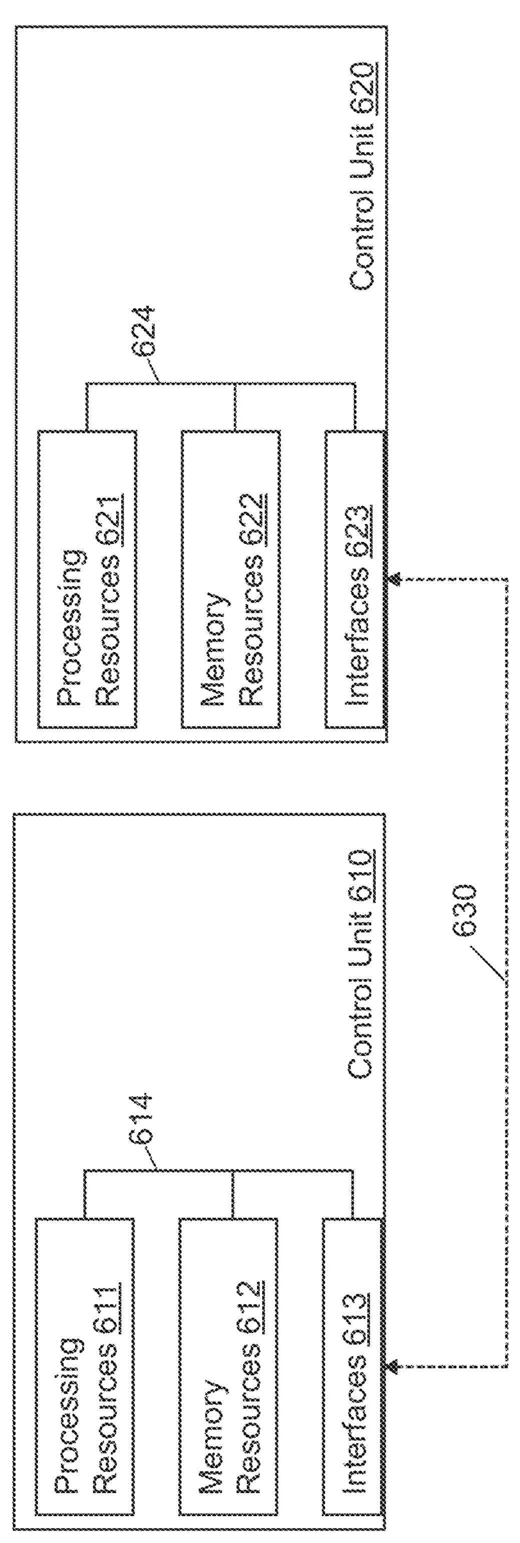
FIG. 6 shows a schematic block diagram illustrating a configuration of control units in which at least some example embodiments are implementable.

Now reference is made to FIG. 6 illustrating a simplified block diagram of control units 610, 620 that are suitable for use in practicing at least some example embodiments. According to an implementation example, process 1 of FIG. 2 is implemented by the control unit 610, and process 2 of FIG. 2 is implemented by the control unit 620.

The control units 610, 620 each comprise processing resources (e.g. processing circuitry) 611, 621, memory resources (e.g. memory circuitry) 612, 622 and interfaces (e.g. interface circuitry) 613, 623, which are coupled via a wired or wireless connection 614, 624.

According to an example implementation, the memory resources 612, 622 are of any type suitable to the local technical environment and are implemented using any suitable data storage technology, such as semiconductor based memory devices, magnetic memory devices and systems, optical memory devices and systems, fixed memory and removable memory. The processing resources 611, 621 are of any type suitable to the local technical environment, and include one or more of general purpose computers, special purpose computers, microprocessors, digital signal processors (DSPs) and processors based on a multi core processor architecture, as non limiting examples.

According to an implementation example, the memory resources 612, 622 comprise one or more non-transitory computer-readable storage media which store one or more programs that when executed by the processing resources 611, 621 cause the control units 610, 620 to function as a NF service consumer or SCP associated with a NF consumer, and a NF service producer or SCP associated with the NF service producer or SEPP or AUSF/UDM, as described above.

According to at least some example embodiments, the NF service consumer (or SCP associated with the NF service consumer) is hardware that includes software, or simply software that is executable by at least one processor of one or more computers, e.g., a distributed computing system or a cloud computing system.

According to at least some example embodiments, the NF service producer (or SCP associated with the NF service producer or SEPP) is hardware that includes software, or simply software that is executable by at least one processor of one or more computers, e.g., a distributed computing system or a cloud computing system.

In an embodiment, an apparatus carrying out at least some of the embodiments described comprises at least one processor and at least one memory including instructions that, when executed with the at least one processor, cause the apparatus to carry out the functionalities according to any one of the embodiments described. According to an aspect, when the at least one processor executes the instructions, the instructions cause the apparatus to carry out the functionalities according to any one of the embodiments described. According to another embodiment, the apparatus carrying out at least some of the embodiments comprises the at least one processor and at least one memory including instructions, wherein the at least one processor and the instructions perform at least some of the functionalities according to any one of the embodiments described. Accordingly, the at least one processor, the memory, and the instructions form processing means for carrying out at least some of the embodiments described. According to yet another embodiment, the apparatus carrying out at least some of the embodiments comprises a circuitry including at least one processor and at least one memory instructions. When activated, the circuitry causes the apparatus to perform the at least some of the functionalities according to any one of the embodiments described.

The control units 610, 620 may be communicatively coupled with each other via connection 630.

According to an example, control unit 610 is or is comprised in the apparatus (e.g. apparatus for consuming a service) performing process 1 of FIG. 2. For example, the control unit 610 may be or may be comprised in NF service consumer or SCP.

According to an example, control unit 620 is or is comprised in the apparatus (e.g. apparatus for providing a service) performing process 2 of FIG. 2. For example, the control unit 220 may be or may be comprised in a NF service producer, SCP or SEPP.

Further, as used in this application, the term "circuitry" may refer to one or more or all of the following:

(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

The term "non-transitory", as used herein, is a limitation of the medium itself (i.e., tangible, not a signal) as opposed to a limitation on data storage persistency (e.g., RAM vs. ROM).

It is noted that, as used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

According to an aspect, an apparatus e.g. comprising an NF service consumer or SCP is provided. The apparatus comprises means for determining that each of one or more network repository functions, NRFs, of a mobile communication network system has become unavailable, means for, based on the determining, switching to an NRF-unavailable state in which a validation of a network function, NF, service consumer based on an access token for a service request towards an NF service producer is relaxed, wherein the access token for the validation is to be acquired from the one or more NRFs, wherein the service request is a request for a service to be provided by the NF service producer, and wherein the NF service consumer is a consumer of the service to be provided by the NF service producer, and means for sending the service request towards the NF service producer, the service request comprising at least an indication of the NRF-unavailable state.

According to at least some example embodiments, in case the access token for the service request towards the NF service producer had been acquired from the one or more NRFs before each of the one or more NRFs became unavailable, the service request further comprises the access token, wherein the access token has expired.

According to at least some example embodiments, the apparatus further comprises means for, in the NRF-unavailable state, adopting a static authorization model which is based on a local configuration.

According to at least some example embodiments, the apparatus further comprises means for identifying the NF service producer based on the local configuration.

According to at least some example embodiments, the service request further comprises a client credentials assertion, CCA, token associated with the NF service consumer, wherein the CCA token is to be used for validation of the NF service consumer.

According to at least some example embodiments, the service request further comprises an identifier of each of the one or more NRFs.

According to at least some example embodiments, the apparatus further comprises means for receiving a notification that each of the one or more NRFs has become unavailable, wherein it is determined that each of the one or more NRFs has become unavailable based on the notification.

According to at least some example embodiments, the one or more NRFs are part of a mobile network of the mobile communication network system, in which the NF service producer is located.

According to at least some example embodiments, the notification is received from an NRF of a mobile network of the mobile communication network system, in which the NF service consumer is located, in response to a request for an access token sent to the NRF or another NRF of the mobile network in which the NF service consumer is located.

According to at least some example embodiments, the means for sending comprises means for, in case the NF service producer and the NF service consumer are located in the same mobile network of the mobile communication network system, sending the service request to the NF service producer.

According to at least some example embodiments, the means for sending comprises means for, in case the NF service producer and the NF service consumer are located in different mobile networks of the mobile communication network system, sending the service request to a mobile network in which the NF service producer is located.

According to at least some example embodiments, at least one of the NF service consumer or the SCP had been registered in the one or more NRFs before each of the one or more NRFs became unavailable.

According to at least some example embodiments, at least one of the NF service consumer or the SCP had performed transport layer security, TLS, authentication with the one or more NRFs before each of the one or more NRFs became unavailable.

According to a further aspect, an apparatus e.g. comprising an NF service producer, SCP or SEPP is provided. The apparatus comprises means for receiving a service request which comprises at least an indication of a network repository function, NRF,-unavailable state, wherein the indication of the NRF-unavailable state indicates that each of one or more NRFs of a mobile communication network system has become unavailable, and that a validation of a network function, NF, service consumer based on an access token for a service request towards an NF service producer is relaxed, wherein the access token for the validation is to be acquired from the one or more NRFs, wherein the service request is a request for a service to be provided by the NF service producer, and wherein the NF service consumer is a consumer of the service to be provided by the NF service producer, and means for processing the service request based on the indication of the NRF-unavailable state.

According to at least some example embodiments, the service request further comprises at least one of the following:

the access token that has expired, a client credentials assertion, CCA, token associated with the NF service consumer, wherein the CCA token is to be used for validation of the NF service consumer, or an identifier of each of the one or more NRFs, and the service request is processed based on the indication of the NRF-unavailable state and at least one of the access token, the CCA token, or the identifier of each of the one or more NRFs.

According to at least some example embodiments, the apparatus further comprises means for determining that each of the one or more NRFs has become unavailable.

According to at least some example embodiments, the apparatus further comprises means for periodically transmitting operation update messages to each of the one or more NRFs, wherein it is determined that each of the one or more NRFs has become unavailable in case, in response to the operation update messages, no reply messages are received continuously over a predetermined time period.

According to at least some example embodiments, the apparatus further comprises means for, based on the determining, switching to the NRF-unavailable state.

According to at least some example embodiments, the NF service producer is in the NRF-unavailable state.

According to at least some example embodiments, the apparatus further comprises means for, in the NRF-unavailable state, adopting a static authorization model which is based on a local configuration.

According to at least some example embodiments, the means for processing comprises means for performing authorization of the NF service consumer based on the local configuration.

According to at least some example embodiments, in case the service request further includes a CCA token associated with the NF service consumer, the authorization of the NF service consumer is performed based on the local configuration and the CCA token.

According to at least some example embodiments, the means for processing comprises means for forwarding the service request to the NF service producer.

According to at least some example embodiments, the means for processing comprises means for returning an error message.

According to at least some example embodiments, the means for processing comprises means for, in case the service request further includes the access token that has expired, accepting the access token that has expired.

According to at least some example embodiments, the means for processing comprises means for, in case the service request further includes the identifier of each of the one or more NRFs, checking, based on the identifier, whether or not each of the one or more NRFs is available, and means for, in case of checking that at least one of the one or more NRFs indicated in the service request is available, returning an error message in response to the service request, and means for, in case of checking that each of the one or more NRFs indicated in the service request is not available, forwarding the service request to the NF service producer, or means for, in case of checking that each of the one or more NRFs indicated in the service request is not available, performing authorization of the NF service consumer.

According to at least some example embodiments, the means for checking comprises means for periodically transmitting operation update messages to each of the one or more NRFs indicated in the service request, wherein it is determined that each of the one or more NRFs indicated in the service request is not available in case, in response to the operation update messages, no reply messages are received continuously over a predetermined time period.

It is to be understood that the above description is illustrative and is not to be construed as limiting. Various modifications and applications may occur to those skilled in the art without departing from the true spirit and scope as defined by the appended claims.

The invention claimed is:

1. A method comprising:

determining, by a network function (NF) service consumer of a mobile communication network, that each of one or more network repository functions (NRFs) of the mobile communication network has become unavailable;

based on the determining, switching, by the NF service consumer, to an NRF-unavailable state in which a validation of a network function, NF, service consumer based on an access token for a service request towards a NF service producer is relaxed, wherein the service request is a request for a service to be provided by the NF service producer, and wherein the NF service consumer is a consumer of the service to be provided by the NF service producer; and sending, by the NF service consumer towards the NF service producer, the service request comprising at least an indication that indicates the NF service consumer is in the NRF-unavailable state.

2. The method of claim 1, wherein the service request further comprises the access token, wherein the access token was received by the NF service consumer before the NF service consumer determined that each of the one or more NRFs has become unavailable and the access token is expired.

3. The method of claim 1, further comprising:

adopting, by the NF service consumer, a static authorization model which is based on a local configuration.

4. The method of claim 3, further comprising: identifying, by the NF service consumer, the NF service producer based on the local configuration.

5. The method of claim 1, wherein the service request further comprises a client credentials assertion (CCA) token associated with the NF service consumer, wherein the CCA token is to be used for validation of the NF service consumer.

6. The method of claim 1, wherein the service request further comprises an identifier of each of the one or more NRFs.

7. The method of claim 1, further comprising:

receiving, by the NF service consumer, a notification that each of the one or more NRFs has become unavailable, wherein the determining comprises determining that each of the one or more NRFs has become unavailable based on the notification.

8. A method comprising:

receiving, by a network function (NF) service producer of a mobile communication network from a NF service consumer of the mobile communication network, a service request which comprises an indication of a RF-unavailable state and an access token for the service request, wherein the indication of the NRF-unavailable state indicates that each of one or more network repository functions (NRFs) of the mobile communication network become unavailable, and indicates that a validation of NF service consumer based on an access token for a service request towards the NF service producer is relaxed, wherein the service request is a request for a service to be provided by the NF service producer, and wherein the NF service consumer is a consumer of the service to be provided by the NF service producer; and processing, by the NF service producer, the service request based on the indication of the NRF-unavailable state, wherein the processing the service request comprises allowing the service request without validation of the NF service consumer based on the access token.

9. The method of claim 8, wherein the service request further comprises at least one of the following:

a client credentials assertion (CCA) token associated with the NF service consumer, wherein the CCA token is to be used for validation of the NF service consumer;

or an identifier of each of the one or more NRFs; and wherein the processing the service request is further based on the at least one of the access token, the CCA token, or the identifier of each of the one or more NRFs.

10. An apparatus for a mobile communication network, the apparatus comprising;

at least one processor; and at least one memory including computer program code of a network function (NF) service consumer of the mobile communication network, wherein the computer program code when executed by the at least one processor, causes the apparatus to perform:

determining that each of one or more network repository functions (NRFs of a mobile communication network has become unavailable;

based on the determining, switching to an NRF-unavailable state in which a validation of a network function NF service consumer based on an access token for a service request towards a NF service producer is relaxed, wherein the service request is a request for a service to be provided by the NF service producer, and wherein the NF service consumer is a consumer of the service to be provided by the NF service producer; and sending send the service request towards the NF service producer, the service request comprising at least an indication that indicates the NF service consumer is in the NRF-unavailable state.

11. The apparatus of claim 10, wherein the service request further comprises the access token, wherein the access token was received by the NF service consumer before the NF service consumer determined that each of the one or more NRFs has become unavailable and the access token is expired.

12. The apparatus of claim 10, wherein the computer program code when executed by the at least one processor, further causes the apparatus to:

adopt a static authorization model which is based on a local configuration.

13. The apparatus of claim 12, wherein the computer program code when executed by the at least one processor, further causes the apparatus to:

identify the NF service producer based on the local configuration.

14. The apparatus of claim 10, wherein the service request further comprises a client credentials assertion (CCA) token associated with the NF service consumer, wherein the CCA token is to be used for validation of the NF service consumer.

15. An apparatus for a mobile communication network, the apparatus comprising:

at least one processor; and at least one memory including computer program code of a network function (NF) service producer of the mobile communication network, wherein the computer program code when executed by the at least one processor, cause the apparatus to perform:

receiving a service request which comprises an indication of a NRF-unavailable state and an access token for the service request, wherein the indication of the NRF-unavailable state indicates that each of one or more network repository functions (NRFs} of the mobile communication network has become unavailable and indicates that a validation of a network function NF service consumer based on an access token for a service request towards an NF service producer is relaxed, wherein the service request is a request for a service to be provided by the NF service producer, and wherein the NF service consumer is a consumer of the service to be provided by the NF service producer; and processing the service request based on the indication of the NRF-unavailable state, wherein the processing comprises allowing the service request without validation of the NF service consumer based on the access token.

16. The apparatus of claim 15, wherein the service request further comprises at least one of the following:

a client credentials assertion, CCA, token associated with the NF service consumer, wherein the CCA token is to be used for validation of the NF service consumer; or an identifier of each of the one or more NRFs; and wherein the processing the service request is further based on the at least one of the access token, the CCA token, or the identifier of each of the one or more NRFs.

17. The apparatus of claim 15, wherein the computer program code when executed by the at least one processor, further cause the apparatus to perform:

determining that each of the one or more NRFs has become unavailable.

18. The apparatus of claim 17, wherein the determining comprises:

periodically transmitting operation update messages to each of the one or more NRFs; and determining that each of the one or more NRFs has become unavailable when no reply messages are received within a predetermined time period in response to the operation update messages.

* * * * *